May 13, 1930. A. H. CANDEE ET AL 1,758,103

APPARATUS FOR GASHING AND SHARPENING HOBS

Filed June 30, 1927

INVENTORS
Allan H. Candee
Ernest C. Head &
Louis D. Nadel
BY
ATTORNEY

Patented May 13, 1930

1,758,103

UNITED STATES PATENT OFFICE

ALLAN H. CANDEE, ERNEST C. HEAD, AND LOUIS D. NADEL, OF ROCHESTER, NEW YORK, ASSIGNORS TO GLEASON WORKS, OF ROCHESTER, NEW YORK, A CORPORATION OF NEW YORK

APPARATUS FOR GASHING AND SHARPENING HOBS

Application filed June 30, 1927. Serial No. 202,697.

The present invention relates to apparatus for gashing and for sharpening hobs, and particularly to apparatus for gashing and sharpening multiple thread taper hobs.

To secure the best and equal cutting action on both sides of the teeth of a hob, the flutes or gashes should be perpendicular to the hob thread at all points along the length of the hob. For single thread cylindrical and taper hobs straight flutes are satisfactory, but where multiple thread hobs are used, spiral flutes are required to secure good cutting action. The present invention relates to spirally gashed hobs, and its purpose is to provide apparatus for gashing and sharpening the flutes of multiple thread taper hobs so as to secure a gash or flute which is substantially perpendicular to the thread at all points along the length of the hob.

A further object of this invention is to provide apparatus which may serve as an attachment for existing machinery and which may be employed in conjunction with the mechanism of such machinery to gash multiple thread taper hobs along lines perpendicular to the hob thread. Other objects of the invention will be apparent hereinafter from the specification and from the recital of the appended claims.

Figure 3:
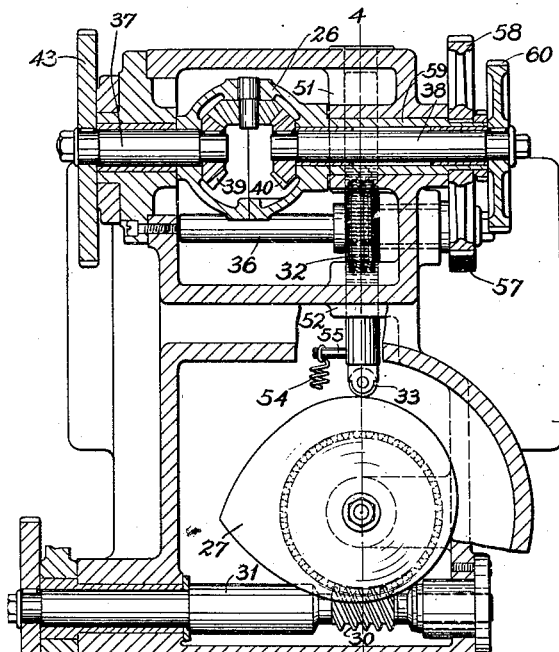
Figure 3 is a sectional plan view of the mechanism shown in Figure 2.
Figure 4:
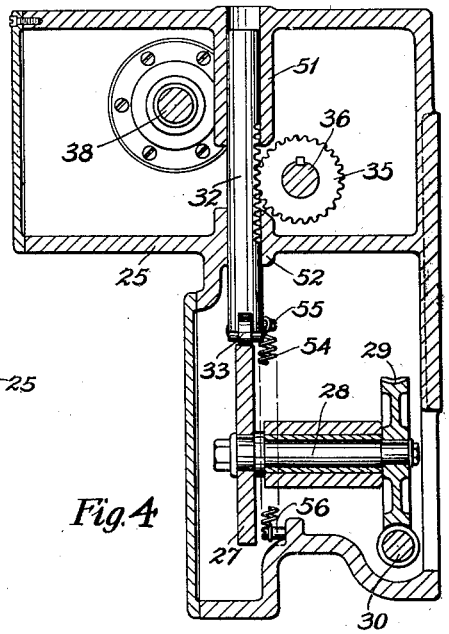
Figure 4 is a section on the line 4—4 of Figure 3.

The improvement of the present invention is illustrated in connection with a milling machine of the conventional type. 10 indicates the body or frame of the machine on which is mounted for vertical adjustment a knee or bed 11 which carries the adjustable slide 12 on which is mounted the table 13. The frame 10 also supports or has formed integral with it the upright 14 on which the tool support, indicated generally at 15 is mounted. The table 13 carries the universal dividing or indexing head 16 and the blank spindle 17. The knee can be adjusted vertically by means of the screw 18 and a horizontal adjustment can be imparted to the slide 12 by means of the crank 19 and the screw (not shown) secured thereto.

The table 13 carries a lead screw 22 which engages with a nut on the slide 12 and by rotating the lead screw the table 13 can be moved longitudinally in either direction to move the work transversely under the tool. In the usual milling machines the lead screw is geared directly to the work spindle, so that as the table moves longitudinally the work spindle is given a rotational movement at a uniform velocity in timed relation with the table movement. The tool is thus caused to produce or grind a flute or gash of uniform lead on the hob. In many cases for multiple thread hobs, however, and particularly in the case of multiple thread taper hobs of constant pitch, a flute of uniform lead is not perpendicular to the thread of the hob at all points along the flute. In such cases, the flute should be curved on a spiral of varying lead. The apparatus of the present invention provides means and particularly an attachment for milling machines of conventional construction, whereby the work may be rotated at a varying velocity in timed relation with the table movement, so that as the tool travels longitudinally of the work, the work will rotate on its axis at a varying velocity and the tool will thus form a flute or gash of the desired varying pitch or lead on the hob.

In the attachment shown in the accompanying drawings, the principal parts are assembled within the housing 25 which is secured in a convenient position on the face or top of the table 13. These parts include the differential, designated generally at 26, the cam 27, the cam shaft 28, the worm wheel 29 keyed thereto, the worm 30, the worm shaft 31, the rack 32, the follower 33, the pinion 35 which meshes with the rack and is rotated on reciprocation of the rack and the stub shaft 36 upon which the pinion is mounted. The housing 25 serves as a support, also, for the shafts 37 and 38 which carry the side gears 39 and 40 of the differential 26.

Both the shaft 37 and the shaft 31 are connected by change gearing with the lead screw shaft 22 and these two shafts 37 and 31 are, therefore, rotated continuously in timed relation with the rotation of the screw 22. The lead screw shaft 22 carries at its outer end a spur gear 42. The shaft 37 is rotated from this spur gear 42 by means of the change gears 43, 44, 45, 46 and 47, while the worm shaft 31 is rotated from the gear 42 by means of the change gears 48, 49 and 50. The shaft 37 carries the side gear 39 and imparts a uniform rotary motion to this gear in timed relation with the rotation of the lead screw. The shaft 31 drives the cam 27 through the worm 30 and worm wheel 29. The rotation of the cam 27 imparts a sliding movement at a varying velocity to the rack 32 through engagement with the roller or follower 33. This rack member slides in suitable bearings 51 and 52 provided in the housing 25 and the follower 33 is held in contact with the cam 27 by means of the coil spring 54 one end of which is attached to a pin 55 secured to the rack 32 and the other end to a pin 56 mounted in the housing 25. The rack 32 moving under actuation of the cam 33 imparts a rotational movement at a varying velocity to the pinion 35 and to the stub shaft 36 to which the pinion is keyed. This stud shaft has mounted adjacent its outer end a gear 57 which meshes with a gear 58 which is secured to the sleeve 59 of the housing of the differential 26. Mounted on the outer end of the shaft 38 which is journaled in this sleeve 59 and which carries the side gear 40 is a spur gear 60. This spur gear 60 drives through the change gears 61, 62 and 63 into the dividing head 16 to rotate the work spindle 17. Thus as the lead screw 22 rotates and feeds the table 13 longitudinally of the hob, one element 39 of the differential rotates at a uniform velocity in timed relation with the table movement and another element of the differential is driven at a varying velocity in relation to the table movement and the two motions are combined through the differential and transmitted to the work spindle, the work spindle being thereby rotated at a varying velocity in conformity with the lead of the spiral flute desired to be produced on the hob.

Figure 1:
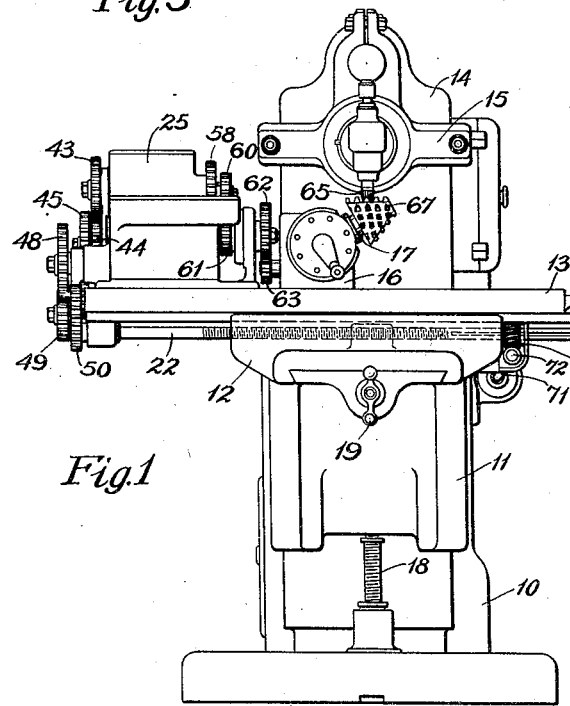
Figure 1 is a side elevation of a milling machine, of usual type, equipped with the apparatus constructed to the present invention.
Figure 2:
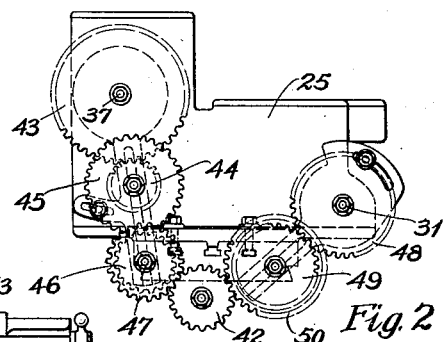
Figure 2 is a partial end elevation of the milling machine, showing the gearing for driving the mechanism of the present invention from the lead screw of the milling machine.
Figure 5:
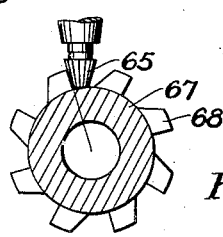
Figure 5 is a diagrammatic view showing an end mill or finger mill in engagement with a hob blank.

The operation of the machine will be clear from the description that has gone before, but may be briefly summed up as follows. A suitable tool is selected and mounted upon the tool support 15. For gashing the flutes originally in a hob, a finger mill or end mill of the type shown in Figures 1 and 5 and designated at 65 will preferably be employed. For resharpening the hob, a pencil grinding wheel or a disc grinding wheel is used. The tool chosen rotates continuously during the operation of the machine and may be driven from the conventional mechanism of the machine (not shown). The work-piece is mounted upon the work spindle 17. In the drawings, the mechanism is shown in position for gashing the flutes of a taper hob 67 whose cutting teeth 68 are arranged in a plurality of threads. A suitable cam 27 is selected for imparting to the blank spindle the required varying rotation to produce flutes of the desired spiral angle upon the hob. The hob 67 shown is a taper hob of constant pitch in axial section. The flutes of a multiple thread hob of this type should be curved along reciprocal spirals. For the hob 67 shown, then, a cam 27 will be selected of a form to produce in conjunction with the uniform motion imparted by the side gear 39 a rotation of the work spindle at a varying velocity such that as the work moves under the cutter 65, the cutter will travel across the hob in a reciprocal spiral path. The various adjustments required to position the work in correct relation to the tool will then be effected by rotating the screw 18, the crank 19 and the crank 70, the latter having a geared connection with the lead screw 22 and permitting hand adjustment of the table 13 in a direction at right angles to the adjustment provided by rotation of the crank 19. The machine is then started. The tool is driven through the conventional mechanism or any suitable mechanism and the lead screw 22 is driven in the conventional way as by means of the telescoping shaft 71, the worm 72 and the worm wheel 73 which has a splined connection with the lead screw, or it may be driven in any other suitable manner. The rotation of the lead screw causes the table 13 to traverse the work 67 relative to the tool. Simultaneously through the gearing 42, 47, 46, 45, 44, 43, the shaft 37 and the gear 39 are rotated and through the gearing 42, 50, 49, 48, the shaft 31, the worm 30, the worm wheel 29, the shaft 28, the cam 27, the rack 32, and its roller 33, the pinion 35, the shaft 36, the pinion 57, the gear 58, the differential housing and sleeve 59, the side gear 48 and the shaft 38 are rotated. The two rotations are combined in the differential and transmitted through the gearing 60, 61, 62, and 63 and the mechanism of the dividing or index head 16 to impart a rotational movement at a varying velocity to the work spindle 17 and the work, thereby to cause the tool to move in a relative spiral path of varying spiral angle longitudinally of the work. After one flute or gash has been cut or ground, the work is indexed by the indexing mechanism of the dividing head 16 which may be of any suitable character and another flute or gash can be cut or ground.

As stated, the present invention may be employed in cutting the flutes or in grinding or resharpening the same and the term "cutting" as employed in the claims is intended to cover both these operations.

While we have described our invention in connection with a particular embodiment and in connection with a specific use, it is to be understood that the invention is capable of various further modifications and uses without departing from the scope of the invention and that this application is intended to cover any adaptations, uses, or embodiments of our invention, following, in general, the principles of the invention and including such departures from the present disclosure as come within known or customary practice in the gear art and may be applied to the essential features hereinbefore set forth and as fall within the scope of the invention or the limits of the appended claims.

Having thus described our invention, what we claim is:

1. In apparatus of the character described, a tool support, a tool mounted thereon, a rotatable work support, a slidable table upon which one of said supports is mounted, means for imparting a cutting movement to the tool, means for moving the table to cause the tool to move longitudinally of the work, a differential, means actuated in timed relation with the table movement for rotating one element of said differential at a uniform velocity, means actuated in timed relation with the table movement for rotating another element of the differential at a varying velocity and means operatively connecting said differential with the work support.

2. In apparatus of the character described, a tool support, a tool mounted thereon, a rotatable work support, a table upon which one of said supports is mounted, means for moving the table to cause the tool to move longitudinally of the work, a differential, means actuated in timed relation with the table movement for imparting rotation at a uniform velocity to one element of said differential, a cam, means actuated in timed relation with the table movement for rotating said cam, means operatively connecting the cam with another element of the differential to impart a varying velocity movement thereto and means operatively connecting the differential with the work support.

3. In apparatus of the character described, a tool support, a tool mounted thereon, a rotatable work support, a table upon which one of said supports is mounted, means for imparting a cutting movement to the tool, a lead screw for moving said table to cause the tool to move longitudinally of the work, and means for rotating said work support in timed relation with the rotation of the lead screw including a differential, means for rotating one element of said differential in timed relation with the rotation of the lead screw and at a uniform velocity, a cam, means for rotating said cam in timed relation with the rotation of the lead screw, and means actuated by the rotation of said cam for imparting a varying velocity movement to another element of said differential.

4. An attachment for a milling machine comprising a differential, means adapted to be connected with the lead screw of the machine and to be actuated by rotation of the same for imparting a uniform velocity movement to said differential, means adapted to be connected with said lead screw and be actuated by rotation of the same for simultaneously imparting a varying velocity rotation to the differential and means adapted to be connected with the work spindle of the machine for rotating said work spindle on actuation of said differential.

5. An attachment for a milling machine comprising a differential, means adapted to be connected with the lead screw of the machine and to be actuated by rotation of the same for imparting a uniform velocity movement to said differential, a cam, means adapted to be connected with said lead screw and to be actuated by rotation of the same for rotating said cam, means adapted to be actuated by rotation of said cam for imparting a varying velocity movement to the differential, and means adapted to be connected with the work spindle of the machine for rotating said work spindle on actuation of said differential.

6. In a machine for fluting or sharpening hobs, a frame, a rotary work support, a table slidably mounted on the frame for movement in a direction longitudinal of the work, means for actuating one of said parts, a train of gearing connecting said parts to maintain a timed relation between their movements including a differential, one element of which is actuated at a variable velocity, means for actuating said element, a tool support, a tool mounted thereon and means for actuating the tool, said table being adapted to carry one of said supports.

7. In a machine for fluting or sharpening hobs, a frame, a rotary work support, a table slidably mounted on the frame for movement in a direction longitudinal of the work, means for actuating one of said parts, a differential, gearing driven by said actuated part for imparting movement to one element of said differential at a varying velocity, gearing for operatively connecting the other two elements of the differential, respectively, with said two movable parts, a tool support, a tool mounted thereon, and means for actuating the tool, said table being adapted to carry one of said supports.

8. In a machine for fluting or sharpening hobs, a frame, a rotary work support, a table slidably mounted on the frame for movement in a direction longitudinal of the work, means for actuating one of said parts, a cam, gearing for driving said cam from said actuated part, a differential, gearing for driving one element of said differential from said cam to impart thereto a movement at a varying velocity, gearing operatively connecting the other two elements of said differential with said two first mentioned parts, respectively, a tool support, a tool mounted thereon, and means for actuating the tool, said table being adapted to carry one of said supports.

ALLAN H. CANDEE.
ERNEST C. HEAD.
LOUIS D. NADEL.